S. O. WHITE.
STEERING WHEEL.
APPLICATION FILED MAR. 22, 1917.
1,233,284.
Patented July 10, 1917.
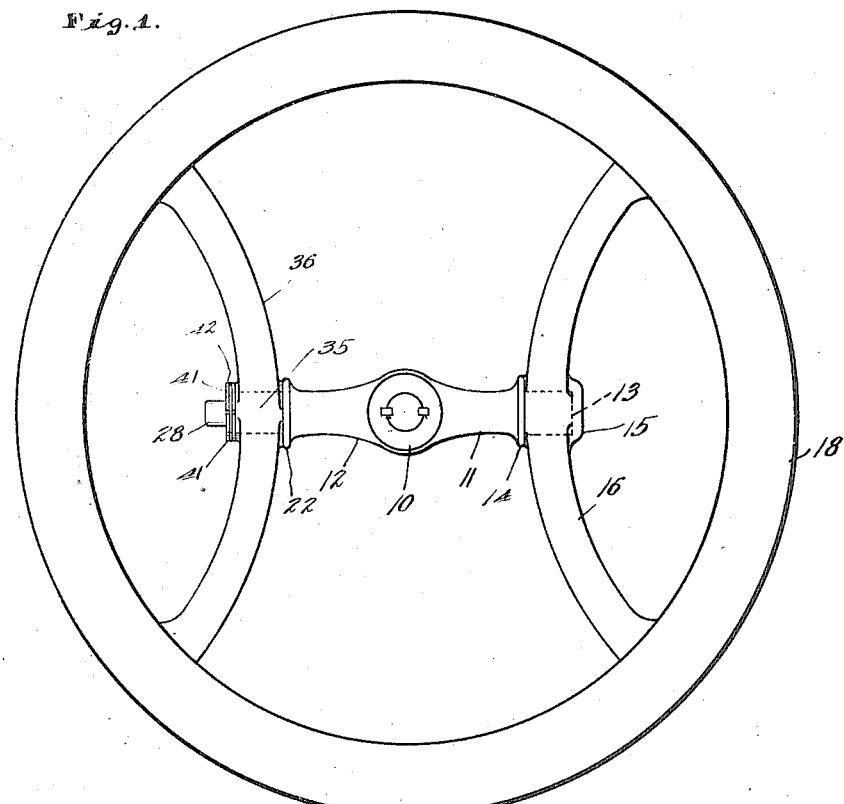
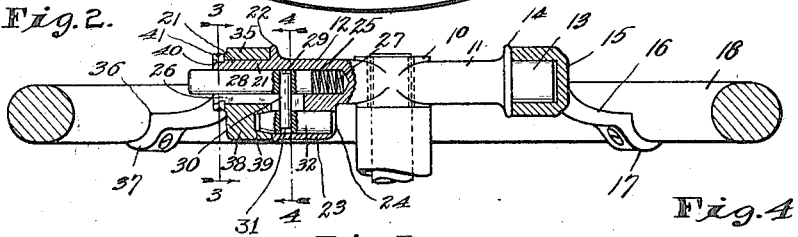
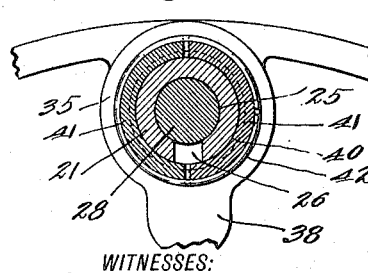
WITNESSES:
Frank A. Sahle
Josephine Gasper
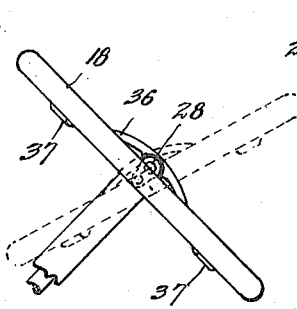
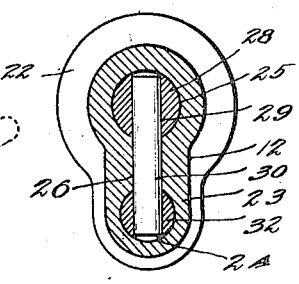
INVENTOR
Samuel O. White,
BY
Hood & Schley
ATTORNEYS

UNITED STATES PATENT OFFICE.

SAMUEL O. WHITE, OF MUNCIE, INDIANA, ASSIGNOR TO WARNER GEAR COMPANY, OF MUNCIE, INDIANA, A CORPORATION OF INDIANA.

STEERING-WHEEL.

1,233,284.  Specification of Letters Patent.  Patented July 10, 1917.

Application filed March 22, 1917. Serial No. 156,586.

*To all whom it may concern:*

Be it known that I, SAMUEL O. WHITE, a citizen of the United States, residing at Muncie, in the county of Delaware and State of Indiana, have invented a new and useful Steering-Wheel, of which the following is a specification.

The object of my invention is to produce an improved form of steering wheel lock of the general type shown in my Patent No. 1,204,724, wherein the construction is such as to be capable of production at very low cost, while, at the same time, being exceedingly rigid and efficient, so that a tilting steering wheel may be supplied as a part of the equipment of low-priced cars.

The accompanying drawings illustrate my invention. Figure 1 is a plan of a steering wheel constructed in accordance with my invention; Fig. 2 an axial section; Fig. 3 a section, on a larger scale, on line 3, 3 of Fig. 2; Fig. 4 a section on line 4—4 of Fig. 2, on the same scale as Fig. 3; and Fig. 5 a side elevation on a small scale.

In the drawings, 10 indicates a boss adapted to be keyed to the upper end of the steering shaft and provided with oppositely projecting arms 11 and 12. The arm 11 is provided at its outer end with a cylindrical boss or trunnion 13 at the base of which is a circumferential flange 14. Boss 13 is adapted to enter and form a journaling support for a closed cup 15 which carries a pair of divergent arms 16 provided with ends 17 adapted to receive the rim 18 of the steering wheel. Arm 12 is provided with a cylindrical boss 21, similar to boss 13, and at the base of which is a circumferential flange 22. While arm 12 is in general similar to arm 11, it is, nevertheless, provided on its lower side with a depending portion 23 which is provided with a bore or perforation 24 which lies substantially parallel with the axis of arm 12. Extending through boss 21 and well into arm 12 is an axial bore 25 which is parallel with bore 24. Bores 24 and 25 are separated from each other and formed through the wall of the boss 21 at its lower side and extending for some distance through the wall of bore 24 so as to form a communication between bore 24 and bore 25 is a slot 26. Mounted in the bottom of bore 25 is a compression spring 27 which engages an operating plunger 28 which is mounted within bore 25 and extended beyond the end of boss 21 so as to be readily engaged by the fingers of an operator. At an intermediate point in its length, plunger 28 is provided with a cross bore 29 in which is mounted a pin 30 which also extends into a cross bore 31 formed in a lock pin 32 mounted in bore 24. Pin 32 is of sufficient length to project to some extend beyond the outer face of part 23 and this projected end is preferably tapered, as indicated in Fig. 2. Journaled upon boss 21 is a sleeve 35 which is provided with oppositely extending arms 36, the ends 37 of which are similar to ends 17 of arms 16 and adapted to receive the rim 18 of a steering wheel. Sleeve 35 is provided on its under side with a depending projection 38 provided in one face with a tapered pocket 39 adapted to receive the tapered end of the lock pin 32.

The outer end of boss 21 extends beyond sleeve 35 and is circumferentially grooved at 40 to receive a pair of retaining segments 41, 41 which are held in place for ready detachment by the spring ring 42 which conveniently lies in a circumferential groove formed in the segments 41.

It will be noted that by this construction the bores 24 and 25 may be readily cheaply and accurately produced. The plunger 28 and pin 32 may be either rigidly connected by pin 30 or the pin 30 may be merely a loose fit in the cross bores 29 and 31. The plunger 28 and lock pin 32 readily inserted in their respective bores, the cross pin 30 traversing the slot 26 and preferably fitting this slot accurately. After these parts have been assembled, sleeve 35 is slipped into place and the retaining segments 41 then placed and retained by the spring retainer 42. The cup 15 is slipped upon boss 13 and the rim 18 then secured to the arms 16 and 36.

I claim as my invention:

1. A steering wheel comprising a main cross head having oppositely extended arms, one of said arms having a substantially axial plunger bore and an adjacent parallel lock pin bore, a steering wheel member journaled upon said arm and provided with a lock-pin recess, an operating plunger mounted in the plunger bore, a lock pin mounted in the lock pin bore, a connection between the operating plunger and the lock pin, and means for retaining the steering wheel member in pivotal connection with the arm.

2. A steering wheel comprising a main cross head having oppositely extended arms, one of said arms having a substantially axial plunger bore and an adjacent parallel lock pin bore, with an intermediate communicating slot, a steering wheel member journaled upon said arm and provided with a lock-pin recess, an operating plunger mounted in the plunger bore, a lock pin mounted in the lock pin bore, a connection between the operating plunger and the lock pin lying in the communicating slot, and means for retaining the steering wheel member in pivotal connection with the arm.

In witness whereof, I have hereunto set my hand at Muncie, Indiana, this nineteenth day of March, A. D. one thousand nine hundred and seventeen.

SAMUEL O. WHITE.

Copies of this patent may be obtained for five cents each, by addressing the "Commissioner of Patents, Washington, D. C."